(12) United States Patent
Hazan

(10) Patent No.: US 12,502,772 B2
(45) Date of Patent: Dec. 23, 2025

(54) ARTIFICIAL INTELLIGENCE BASED ROBOT CABLE SIMULATION

(71) Applicant: Siemens Industry Software Ltd., Tel Aviv (IL)

(72) Inventor: Moshe Hazan, Elad (IL)

(73) Assignee: Siemens Industry Software Ltd., Tel Aviv (IL)

( * ) Notice: Subject to any disclaimer, the term of this patent is extended or adjusted under 35 U.S.C. 154(b) by 128 days.

(21) Appl. No.: 18/568,414

(22) PCT Filed: Jun. 8, 2021

(86) PCT No.: PCT/IB2021/055033
§ 371 (c)(1),
(2) Date: Dec. 8, 2023

(87) PCT Pub. No.: WO2022/259021
PCT Pub. Date: Dec. 15, 2022

(65) Prior Publication Data
US 2024/0269837 A1 Aug. 15, 2024

(51) Int. Cl.
*B25J 9/16* (2006.01)
*G06F 30/27* (2020.01)
(Continued)

(52) U.S. Cl.
CPC ............. *B25J 9/163* (2013.01); *B25J 9/1661* (2013.01); *B25J 9/1671* (2013.01)

(58) Field of Classification Search
CPC ........ B25J 9/163; B25J 9/1661; B25J 9/1671; B25J 9/1674; G06F 30/27; G06F 2113/16;
(Continued)

(56) References Cited

U.S. PATENT DOCUMENTS

2005/0197814 A1 9/2005 Aram et al.
2010/0030532 A1 2/2010 Arora et al.
(Continued)

OTHER PUBLICATIONS

Sainul et al. "A three finger tendon driven robotic hand design and its kinematics model." In: CADCAM, Robotics and Factories of the Future, 2016, [online] [retrieved on Aug. 25, 2021 (Aug. 25, 2021)], Retrieved from the Internet< URL: https://link.springer.com/chapter/10.1007/978-(Aug. 25, 2021)] Retrieved from the Internet< URL: https://link.springer.com/chapter/10.1007/978-81-322-2740-3_30 >, entire document.

*Primary Examiner* — Adam R Mott
*Assistant Examiner* — Heather J Keniry
(74) *Attorney, Agent, or Firm* — Laurence A. Greenberg; Werner H. Stemer; Ralph E. Locher

(57) ABSTRACT

A system and a method simulate a motion of a cable of a real kinematic system, e.g. robot, containing one or several joints. The method includes the following steps: receiving a virtual representation of the real kinematic system; receiving a target task to be performed by the real kinematic system; perform the target task, and the simulation is configured for calculating a next joint value from a previous joint value. The method is characterized in that each simulation time interval results in a calculation of a next joint value from a previous joint value, and the next joint value is used as an input to a cable position artificial intelligence algorithm trained for outputting a cable position for the next joint value. The outputted cable position for the next joint value is stored.

15 Claims, 3 Drawing Sheets

(51) Int. Cl.
*G06F 113/16* (2020.01)
*G06F 119/14* (2020.01)

(58) Field of Classification Search
CPC ...... G06F 2119/14; G05B 2219/40311; G05B 2219/40318; G05B 2219/40515
See application file for complete search history.

(56) References Cited

U.S. PATENT DOCUMENTS

2019/0324424 A1* 10/2019 Bächer .................... G06F 30/00
2020/0125234 A1 4/2020 Lee
2022/0035352 A1* 2/2022 Pathre ................ G05B 19/4188
2024/0005060 A1* 1/2024 Iwamura ............... B25J 9/1671

* cited by examiner

A

B

C

D

ARTIFICIAL INTELLIGENCE BASED ROBOT CABLE SIMULATION

BACKGROUND OF THE INVENTION

Field of the Invention

The present disclosure is directed, in general, to computer-aided design, visualization, and manufacturing ("CAD") systems, product lifecycle management ("PLM") systems, product data management ("PDM") systems, and similar systems, that manage data for products and other items (collectively, "Product Data Management" systems or PDM systems). More specifically, the disclosure is directed to production environment simulation. The present disclosure is also directed to the control and/or command of a robot, or more generally speaking, of a kinematic system, based on a simulation result of said kinematic system.

Complex kinematic systems, such as robots, are widely used in industrial applications for performing automatic or semi-automatic robotic operations along a predefined or live calculated trajectory. One of the main causes of downtime related to robotic operations in a manufacturing environment is robot cable failure. Usually, the robot cable moves with and around robot arms. Depending on the tasks and/or poses of the robot, the cable may stretch too much or even tear. Consequently, robots have to be controlled in an appropriate way so that damages to cables are avoided.

Virtual robotic application tools, like Siemens PLM Process Simulate, enable to simulate the cable movement as part of the robot simulation. Unfortunately, such cable simulation is too slow and time consuming for being used during real time robot process simulations, like welding processes, folding processes, etc., and consequently, the robot processes are simulated without taking into account cable constraints which may be the cause of cable failures, notably when said processes are repeatedly performed by the robot.

Therefore, improved techniques for simulating kinematic system cable motion are desirable.

BRIEF SUMMARY OF THE INVENTION

The present invention proposes to use artificial intelligence (AI) to determine a motion of a cable of a kinematic system, and preferentially to automatically select a motion of the kinematic system that will decrease the risk of cable failure resulting from said motion of the kinematic system. Various disclosed embodiments include methods, systems, and computer readable mediums for simulating a motion of a cable of a real kinematic system, e.g., a robot. The kinematic system comprises typically several parts or members, wherein at least one part is connected to another part with a joint enabling a relative motion of said at least one part with respect to said another part. The kinematic system may comprise thus several of said joints, each configured for connecting at least two members or parts of the real kinematic system, enabling the latter to achieve complex trajectories or motion. Said cable comprises notably at least one part fixedly attached to or supported by one of said members, and at least another part fixedly attached or supported by another one of said members.

A method includes receiving a virtual representation of the real kinematic system. The method further comprises receiving a target task to be performed by the real kinematic system, notably with respect to its surrounding environment. The method comprises also determining or receiving a starting pose of the real kinematic system. The method comprises then using the virtual representation of the real kinematic system for simulating, from said starting pose, a motion of the real kinematic system enabling the latter to perform the target task, wherein the real kinematic system is simulated free of said cable, i.e. without said cable. The simulation is configured for calculating a next joint value from a previous joint value, notably for each joint of the real kinematic system. The method according to the invention is characterized in that at the end of each simulation time interval resulting in a calculation of a next joint value from a previous joint value, it uses the calculated next joint value as inputs to a cable position AI algorithm trained for outputting a cable position for said calculated next joint value. The method comprises finally storing the outputted cable position for said next joint value, and displaying the virtual representation of the real kinematic system characterized by said next joint value and its associated outputted cable position.

A data processing system comprising a processor and an accessible memory or database is also disclosed, wherein the data processing system is configured to implement the previously described method.

The present invention proposes also a non-transitory computer-readable medium encoded with executable instructions that, when executed, cause one or more data processing systems to perform the previously described method.

An example of computer-implemented method for creating a training dataset for training a cable position AI algorithm according to the invention is described. This computer-implemented method comprises:

a) receiving a virtual representation of the real kinematic system;

b) receiving a starting pose and a set of end poses for the real kinematic system, said end poses defining for instance different positions that have to be reached by the real kinematic system;

c) for each end pose, simulating a motion of the real kinematic system from the starting pose to the end pose, wherein said simulation is configured for simulating the motion of the real kinematic system and of its cable, wherein, at the end of each simulation time interval resulting in a calculation of a next joint value from a previous joint value and in a corresponding simulated cable position for said next joint value, a joint value data subset comprising the next joint value is collected for populating an input training dataset, and a cable information data subset comprising the corresponding simulated cable position is associated to said joint value data subset and collected for populating an output training dataset;

d) storing the input and the output training datasets.

An example of computer-implemented method for providing a trained cable position AI algorithm configured for simulating a motion of a cable of a real kinematic system is also proposed by the present invention. This computer-implemented method comprises:

a) receiving a training dataset with a first interface, wherein said training dataset comprises an input training dataset and an output training dataset, wherein the input training dataset comprises:
several joint value data subsets, wherein each joint value data subset comprises a next joint value,
and the output training dataset comprises:
for each joint value data subset, a cable information data subset comprising a corresponding simulated cable position;

b) training the cable position AI algorithm, wherein the joint value data subsets are used as input training data for the cable position AI algorithm and the cable information data subsets are used as output training data;

c) providing the trained cable position AI algorithm with a second interface.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise", as well as derivatives thereof, mean inclusion without limitation; the term "or" is inclusive, meaning and/or; the phrases "associated with" and "associated therewith", as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE SEVERAL VIEWS OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Previous techniques for simulating the motion of a cable of kinematic systems have some drawbacks. Indeed, the cable usually forms a complex subsystem of the kinematic system, and requires complex algorithms to determine its behavior during motion of the kinematic system. The embodiments disclosed herein provide numerous technical benefits, including but not limited to the following examples. In particular, the present invention proposes to use AI to determine a cable position in function of a simulated pose of a kinematic system. Using AI enables the system to work in real time. Indeed, the mechanical and material properties of the cable are not used as inputs in the simulation according to the invention, but only joint values, which enables a fast processing of the cable position. According to the present invention, the only use of simulated values of the kinematic system joints enables thus to determine a corresponding position for the cable. The kinematic system can thus be simulated without its cable, and for each change of a joint value, a new cable position can be determined by the cable position AI algorithm. Thanks to the new concept according to the invention, the cable position AI algorithm can be trained to output, from joints values received in input, rates of forces acting on the cable or parts of the latter, enabling therefore to rapidly identify in real time potential cable failures resulting from some specific motions of the kinematic system. It becomes thus possible to put aside such specific motions so that the kinematic system be only controlled using motions that have the lowest probability to result in cable failures. Advantageously, the proposed method can be used to solve any analogous problems of subsystem positioning determination, for any complex kinematic system.

Figure 1:
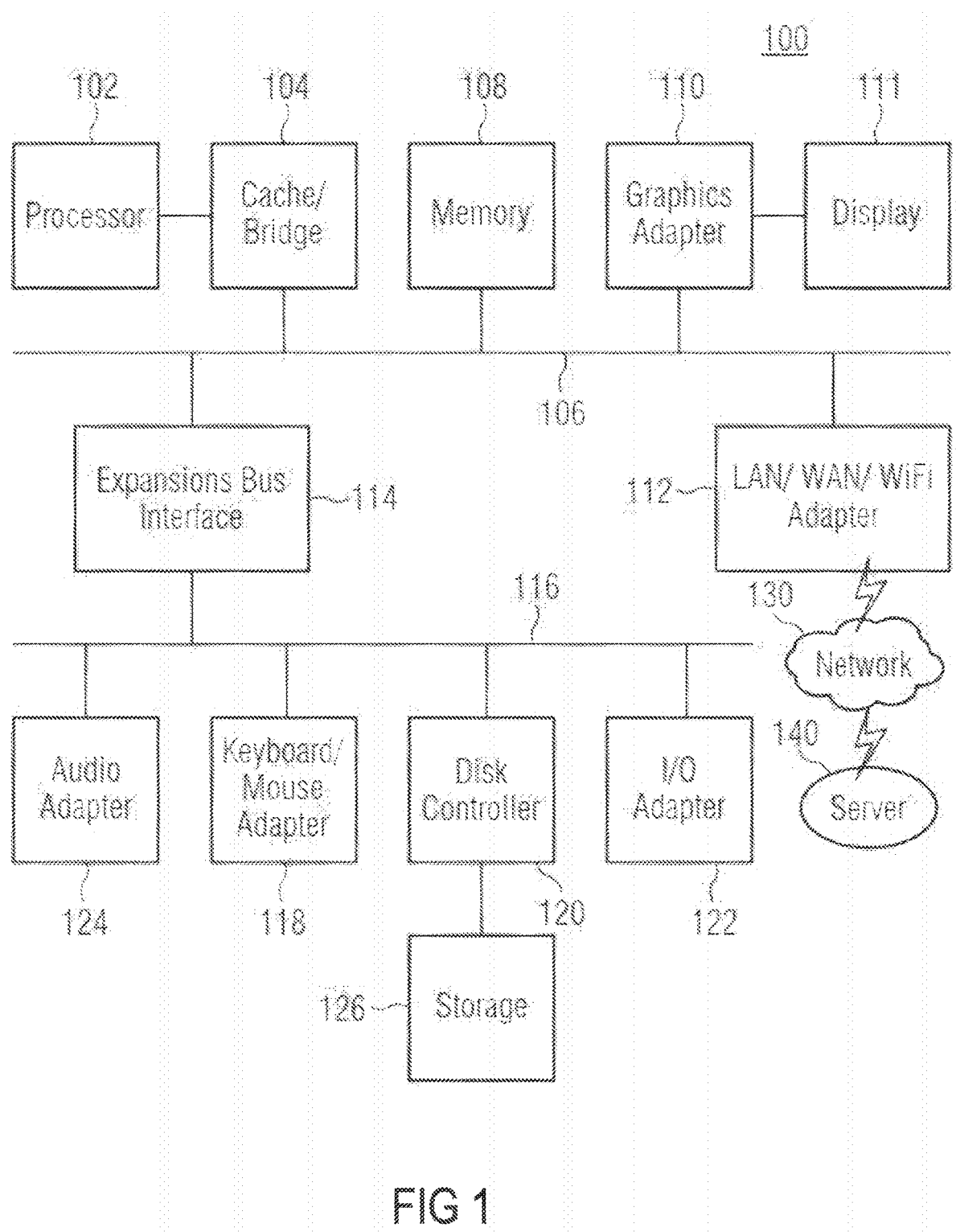
FIG. 1 illustrates a block diagram of a data processing system in which an embodiment can be implemented.

FIG. 1 illustrates a block diagram of a data processing system 100 in which an embodiment can be implemented, for example as a PDM system particularly configured by software or otherwise to perform the processes as described herein, and in particular as each one of a plurality of interconnected and communicating systems as described herein. The data processing system 100 illustrated can include a processor 102 connected to a level two cache/bridge 104, which is connected in turn to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but are not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

As used herein, the term kinematic system refers to any real mechatronic system characterized by a motion in a surrounding environment. It can be a robot, like an industrial robot, or any other type of kinematic machine. Such kinematic systems are typically used for performing some target tasks, like manufacturing processes (e.g. automatic welding, screwing, etc.). The kinematic system posture or pose in function of the time has thus to be accurately determined and controlled, so that the target task can be appropriately accomplished. Usually, such kinematic systems receive a list of target positions, motion instruction defining how to reach each of said target positions (speed, acceleration, etc.), and process instructions (i.e. what to do at said target position, like weld, laser, cut, etc.). The present invention focuses essentially on the problematic of kinematic systems comprising at least one cable which might be impacted by the motion of the kinematic system or of a part of the latter. The present invention enables indeed to quickly determine which cable position of the kinematic system at a given time might potentially lead to a cable failure.

Figure 2:
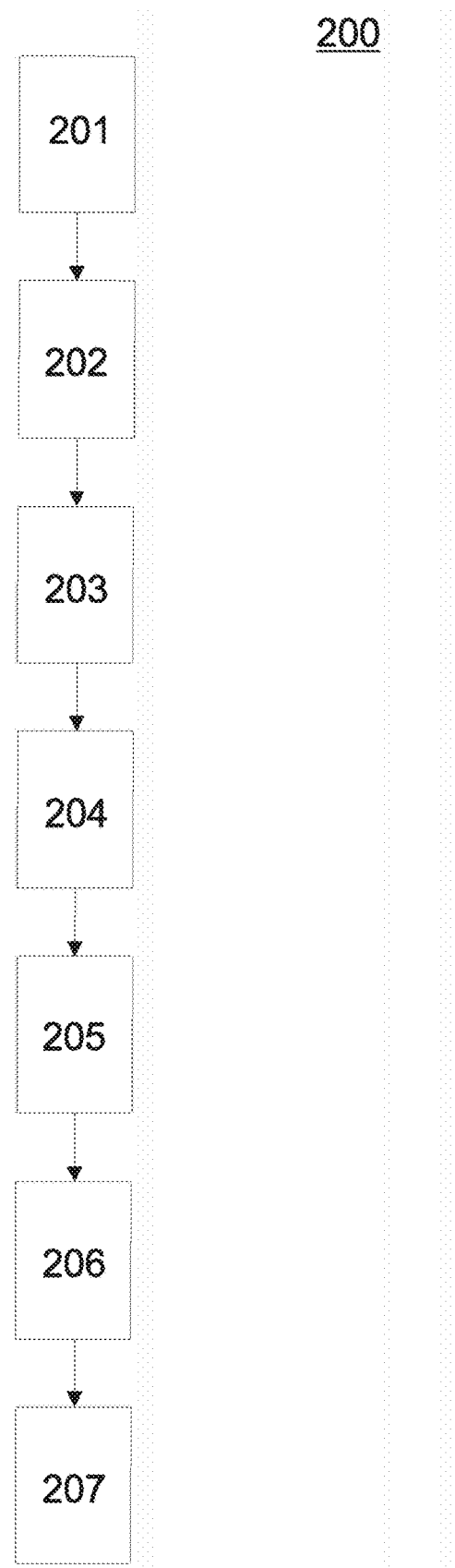
FIG. 2 illustrates a flowchart for simulating a motion cable of a real kinematic system according to the invention.

FIG. 2 illustrates a flowchart 200 of a method for simulating a motion of a cable of a real kinematic system. Such method can be performed, for example, by the data processing system 100 of FIG. 1 which has been previously described. Of course, the "system" in the following description of the method according to the invention can be any apparatus suitable for performing the described process.

The method according to the invention will be now described in more details in connection with FIG. 2.

Figure 3:
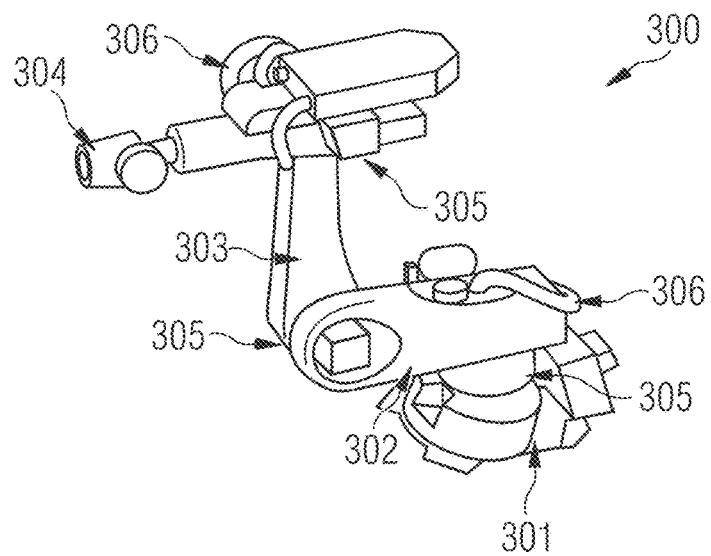
FIG. 3 shows a virtual representation of a kinematic system according to the invention.

At step 201, the system 100 according to the invention receives a virtual representation of the kinematic system. An example of a virtual representation 300 is shown in FIG. 3. It is preferentially a 3-dimensional (3D) virtual representation of a kinematic system. The latter may comprise several parts or members as schematically represented by the reference numbers 301, 302, 303, 304 on the virtual representation, wherein said members can move with respect to one another and form the body of the kinematic system. In order to enable said moving, joints 305 connect the different members of the kinematic system. Thanks to said joints, the kinematic system is articulated. As known in the art, said joints might be of different types, like rotational joints enabling the rotation of one kinematic system member with respect to another one and translation joints enabling a translation of one kinematic system member with respect to another one. The pose or posture of the kinematic system might be defined by joint values, wherein the value of, or associated to, a joint defines the relative position of the kinematic system members connected by said joint. The joint values might be a distance value for a translational joint, and/or an angle value for a rotational joint, and/or a number of turns for a rotational joint. Consequently, if the kinematic system comprises for instance N joints, then knowing the joint values of said N joints accurately define a pose or posture for the kinematic system, since it defines the relative position of each member. The virtual representation of the kinematic system models thus said members and joints of the real kinematic system.

The kinematic system according to the invention comprises at least one cable 306. Said cable is typically used for bringing energy to kinematic system motors and/or actuators (e.g. hydraulic energy, or electric energy, etc.) and/or for enabling a communication between a kinematic system main controller and subsystems involved in the positioning of a member and/or in the control of actions or processes like welding, painting, assembling, etc. The cable extends from a first extremity to a second extremity, typically connecting the main controller to one or several of said subsystems, and might have some parts fixedly attached to, and/or supported by, one or several members of the kinematic system and some parts freely hanging between said fixedly attached and/or supported parts. During motion of the kinematic system members, the cable might be submitted to loading forces like twisting and stretching forces, acting for instance on the hanging parts and/or on the fixedly attached/supported parts. The motion of the cable during motion of the kinematic system might be simulated using known in the art techniques based on the mechanical and/or material properties of the cable. In such a case, the cable might be modeled as a series of links Li (or cable subparts) extending from a first link L1 corresponding to a first extremity of the cable to a last link Ln corresponding to the second extremity of the cable. The cable is thus modeled as a set of links, successively connected to one another from the first link L1 modeling the first extremity to the last link Ln modeling the second extremity of the cable. Depending on the fixation of the cable to the kinematic system, all links will not have the same degrees of freedom. Such simulation is known in the art, and no further details are provided here, since easily available in the literature. According to known in the art simulations of kinematic systems, at the end of each simulation time interval, i.e. at each simulation step, the position of each link is calculated, providing thus the overall position of the cable. Therefore, knowing, at the end of each simulation time interval, e.g. at a time Ti, the position of each link in a same frame of reference as the one used for representing the virtual representation of the kinematic system enables to determine the position of the cable for the pose of the kinematic system at said time Ti, wherein said pose at the time Ti is defined by a set of next joint values calculated from a set of previous joint values. Unfortunately, the known in the art techniques for calculating said position of the cable are very slow and cannot be used in real time. As shown below, the present invention proposes to skip the simulation of the cable based on material and/or mechanical properties, and to "replace" the latter by a technique based on AI in order to get a more efficient simulation of a kinematic system that enables to determine in real time if a motion of the kinematic system can lead to a cable failure.

At step 202, the system 100 receives a target task to be performed by the real kinematic system, notably with respect to its surrounding environment. Said target task is for instance a target position to be reached by the kinematic system, for instance by an extremity of at least one of its members. The target task might be configured for defining an action or process to be performed by the kinematic system at said position and that depends on the surrounding environment, or a position to be reached by at least one part or tool of the kinematic system with respect to its surrounding environment. In particular, once the system according to the invention knows the target task to be performed, then it is configured for automatically determining a set of end poses enabling the kinematic system to perform said target task.

At step 203, the system 100 receives or determines a starting pose of the real kinematic system. Said starting pose might be a nominal pose of the kinematic system. It might also be a previous end pose resulting from a previous task completed by the kinematic system. The starting pose might be defined in a memory of the kinematic system, and it could be a fixed parameter (e.g., a set of nominal joint values) stored in a memory of the system 100 according to the invention, defining a predefined pose for the virtual representation of the real kinematic system.

At step 204, the system 100 uses the virtual representation of the real kinematic system for simulating, from said starting pose, a motion of the real kinematic system enabling the latter to perform the target task. For this simulation, the system uses know in the art techniques, but it distinguishes from said known in the art techniques in that the cable is not simulated during said simulation. In other words, the real kinematic system is simulated free of said cable, i.e., without said cable. Indeed, at step 204, the system 100 according to the invention simulates the motion of the members of the real kinematic system, and not of its cable. Said motion of the kinematic system, i.e., of its members, starts with the position (i.e. joint values) of the members corresponding to the starting pose. At each simulation step, i.e. at the end of each simulation time interval, a set of next joint values is calculated from a set of known previous joint values (which either correspond to the starting pose or to previously calculated joint values). This process is repeated until the kinematic system reaches an end pose enabling the latter to perform said target task. Consequently, successive sets of joint values are calculated, the calculation of a next set of joint values being obtained from a previous set of joint values, enabling the kinematic system to take a succession of poses (each corresponding to a set of joint values) going from the starting pose and ending with an end pose that enables the kinematic system to perform the target task. The simulation of the motion of the members of the kinematic system enables to determine thus successive sets of joint values that will enable the kinematic system to perform the target task. Therefore, if one defines the kinematic system as comprising (i) at least two members capable of relative motion with respect to one another and (ii) one or several cables comprising each at least one part fixedly attached to and/or supported by one of said members, then, at step 204, the system is configured for simulating only the motion of (i) the members, the motion of (ii) the one or several cables being thus ignored.

At step 205, contrary to existing simulation techniques, the system 100 is configured for using, at the end of each simulation time interval resulting in a calculation of a next joint value from a previous joint value—notably in the calculation of a set of next joint values from a set of previous joint values—, the next joint value—notably the set of next joint values—as input(s) to a cable position AI algorithm trained for outputting a cable position for said next joint value—notably for said set of next joint values. The joint values used as input might be for instance, a translation distance and/or a rotational angle and/or a number of turns value. For instance, the input joint values might be: 50 cm for a first joint (translational joint), 2.5 turns defined for a second joint (rotational joint), −28 cm for a third joint (translational joint). Of course, as known in the art, each joint value is defined according to a direction of extension for the translational joints and a direction of rotation for rotational joints. Optionally, a previously calculated cable position might be used as input to the cable position AI algorithm, together with the sets of next joint values, for calculating the "next" cable position corresponding to the next pose characterized by said next joint values. In that case, the position of the cable for the starting pose is known and used during the first simulation time interval for calculating the next position of the cable corresponding to the next pose, i.e. the pose temporally directly following the starting pose. Additionally, or alternately, a previous joint value or resp. a set of previous joint values, used for calculating a next joint value, resp. a set of next joint values, might be also used as input to the cable position AI algorithm. In such a case, the cable position AI algorithm would be trained to use as inputs (a) a previous joint value and (b) a next joint value calculated from said previous joint value, (c) optionally a previous cable position (e.g. the previous position of all links), in order to output a next cable position (the next position of all links).

Therefore, contrary to existing solutions enabling the simulation of a cable based on cable mechanical and material properties, the present invention proposes that at the end of each simulation step, a set of next joint values comprising values for all joints of the kinematic system, and optionally a set of previous joint values comprising values for all joints of the kinematic system and/or a set of previous link position values for all links of the cable, are used as inputs to the cable position AI algorithm. The latter is preferentially a regression supervised learning algorithm. According to the present invention, the cable position AI algorithm has been trained using machine learning for outputting, from the received inputs, a cable position, and optionally an estimation of a value or rate of a force acting on the cable, like a rate of twist and force acting on the cable or a part of the latter. This estimation of the force value aims notably to determine or evaluate, at each simulation time interval, whether one or several parts of the cable are under loading conditions that could affect the mechanical properties of the cable, or otherwise said, that could deteriorate the cable during motion of the kinematic system. Thus, compression, tension, bending, shear, and torsion acting on the cable might be evaluated by the system according to the invention in order to evaluate the risk of failure of the cable during motion of the kinematic system. The outputted cable position calculated with respect to the next joint value, or set of next joint values, comprises for instance the position of each of said links or cable subparts of said set of links. Preferably, the force value comprises for instance, for each link of the cable, estimated values of twisting and/or stretching and/or bending forces acting on the considered link and obtained as output of the cable position AI algorithm. Consequently, the system according to the invention is able to get, at the end of each simulation time interval, the following results: said set of next joint values and a corresponding position of each link of the cable, as well as optionally forces acting on each link, like twisting and/or stretching and/or bending forces. These results might be used then for displaying said virtual representation of the kinematic system at the end of each simulation time interval, providing notably a smooth motion from the starting pose to the end pose, said motion including the motion of the cable.

At step 206, the system 100 stores the outputted cable position for said next joint value in a memory or in a database. Preferentially, the system 100 is configured for storing all sets of joint values that have been calculated, and for each of said sets, the corresponding position and, optionally, forces like twisting and/or stretching forces, for each link of the cable. In other words, the system may store the results obtained at the end of each time interval of the simulation.

At step 207, the system 100 is configured for displaying the virtual representation of the real kinematic system characterized by said next joint value and its associated outputted cable position, and optionally, for displaying also the forces acting on said cable, notably on each link of said cable, like twisting and/or stretching forces. Thanks to the use of AI, the position and optionally twisting and/or stretching forces can be calculated in real time, and thus it becomes possible to display the motion of the kinematic system and of its cable in real time, during the simulation.

Figure 4:
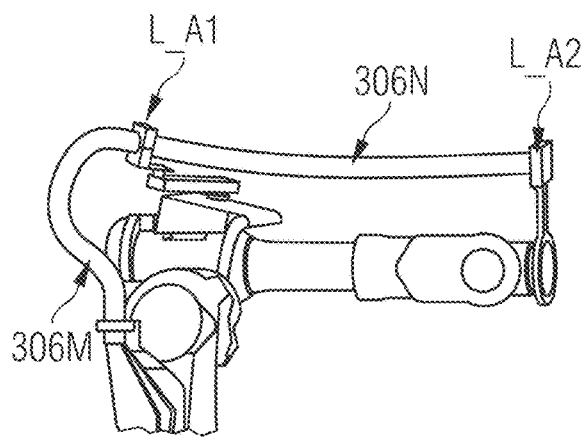
FIG. 4 presents a preferred implementation of displaying a cable failure probability value according to the invention.
Figure 4:
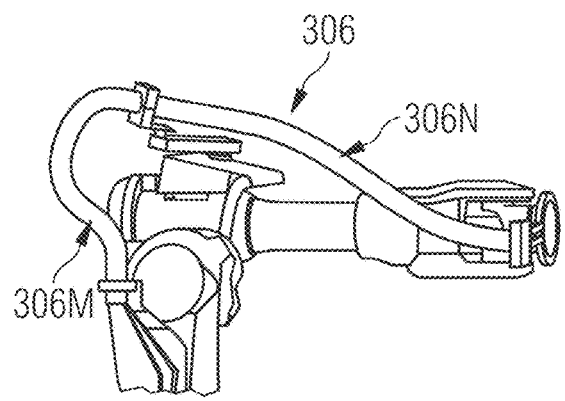
Figure 4:
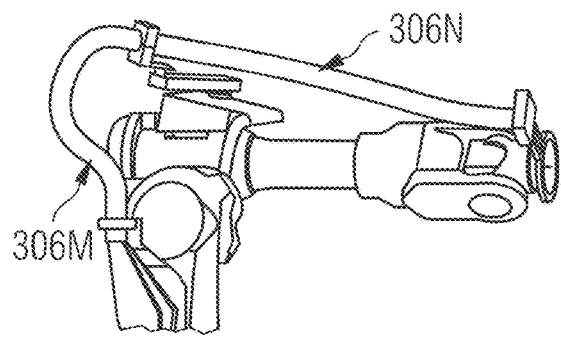
Figure 4:
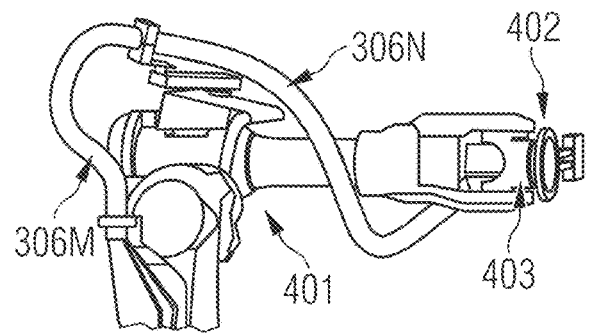

FIG. 4 shows for instance a color-encoded representation of the twisting and/or stretching forces acting on the cable 306 of the kinematic system 401. Four different poses, respectively pose A (top left image), pose B (top right image), pose C (bottom left image), and pose D (bottom right image), are shown for the same kinematic system 401. Each of said pose enables to reach a target position with the extremity 402 of the member 403 of the kinematic system 401. Preferentially, a color is associated to each link of the cable in function of the calculated twisting and/or stretching forces acting on the considered link. Alternatively, the color encoding the highest stretching and/or twisting force value is then used for displaying all successive neighboring links comprised in a succession of links, wherein said succession of links is itself comprised between, or limited by, two links (one at each end of the succession of links) that are each fixedly attached to a member of the kinematic system, like the link L_A1 and L_A2 in pose A of FIG. 4. For instance, the part 306M of the cable 306 has the same color for the four poses A, B, C, D, e.g. a green color, but the part 306N presents a different color for each of the different poses, namely, a green color for pose A, a yellow color for pose C, an orange color for pose B, and a red color for pose D, wherein the colors enable to encode the probability of cable failure when performing the target task, green corresponding for instance to no failure, yellow to low risk of failure, orange to medium risk of failure, and red to high risk of failure. It is thus possible to efficiently display and highlight kinematic system poses that might be problematic, using for instance color-encoded values of said risk of failure.

Preferentially, the system 100 according to the invention is configured for automatically controlling the real kinematic system according to the simulated joint values, and thus outputted cable positions. For instance, once the system 100 has stored the successive sets of joint values enabling the kinematic system to perform the target task, it might use said successive sets of joint values for controlling motors and/or actuators of the kinematic system. Preferentially, the system 100 might be configured for automatically selecting a succession of sets of joint values that enable the kinematic system to perform the target task and for which the risk of cable failure is the lowest. For instance, the system might determine different series of temporally successive sets of joint values, each series being configured for enabling the kinematic system to perform the target task from the starting pose, and then the system might be configured for automatically choosing, notably in function of forces acting on each link of the cable, like twisting and/or stretching forces, the series of temporally successive sets of joint values that is characterized by the lowest probability of cable failure. Preferentially, if several series of temporally successive joint value sets have the same lowest probability of cable failure, then the system might be configured for automatically choosing the series that is characterized by the lowest energy consumption (e.g. corresponding to a shortest total translation distance that is obtained by summing the absolute value of all translation distances, and/or a smallest total rotational angle that is obtained by summing the absolute value of all rotational angles).

For instance, the system 100 according to the invention might be configured for determining a set of end poses enabling the real kinematic system to perform the target task (e.g. to reach the target position). Then, for each of said end poses, the system performs the simulation of the motion of the kinematic system, i.e. of the motion of the members of the kinematic system (without the simulation of the cable), wherein said motion starts from the starting pose and ends with the end pose, wherein at the end of each simulation time interval, the cable position AI algorithm is further configured for outputting a cable failure probability value, which is typically calculated from a force acting on the cable or on each link of the cable, for instance from said twisting and/or stretching forces. Therefore, for each of said end pose, a series of temporally successive sets of joint values is obtained and enables the kinematic system to reach said end pose from the starting pose. Then, the system is further configured for automatically selecting the end pose corresponding to the lowest cable failure probability value, and for controlling the real kinematic system, e.g. motors and/or actuators of the latter, according to the simulated joint values, i.e. according to the series of temporally successive sets of joint values which enable said motion and that result in said lowest cable failure probability value.

In order to train the cable position AI algorithm, the present invention proposes to automatically creates a training dataset. For this purpose, the data processing system 100 according to the invention might be further configured for receiving a virtual representation of the kinematic system, a starting pose of the latter (e.g. a nominal pose), and a set of end poses. Then the system simulates a motion of the kinematic system, including its cable, from said starting pose to each of the end poses. For this simulation, the system may use known in the art techniques based for instance on the mechanical and material properties of the cable and on rigid body motion equations of each mobile member of the kinematic system. During this simulation, the system 100 stores, for each pose of the kinematic system, a set of joint values characterizing a next pose and a set comprising all link positions characterizing the position of the cable for said next pose, and optionally, a set of joint values characterizing a previous pose with respect to said next pose. At the end of each time interval of the simulation, the above-mentioned sets (next pose joint value set, link position set, and optionally previous pose joint value set) are stored in a memory or database. Optionally, an additional set of data is stored together with the previously mentioned sets of data at the end of each simulation time interval, it is a set comprising for each link the current twisting and/or stretching forces acting on the considered link. All this information is then used for creating the training dataset. For instance, the system may create a training input dataset and a training output dataset. The training input dataset may comprise joint value data subsets, wherein each joint value data subset comprises at least said set of joint values characterizing a next pose, and optionally said set of joint values characterizing a previous pose. The training output dataset comprises, for and associated to each joint value data subset, a cable information data subset, the latter comprising said set of all link positions characterizing the position of the cable associated with the next pose and optionally said additional set of data related to the forces acting on the considered links.

The system 100 uses then said training dataset for training the cable position AI algorithm. Thanks to this training, the cable position AI algorithm is able to output, from a set next joint values defining each the joint value of each joint of the kinematic system and, optionally and additionally, from a set of previous joint values, the position of each link of the cable corresponding to the pose characterized by said set of next joint values, and optionally, the rate of force, e.g. stretching and/or twisting forces, acting on each link of the cable. After said training, an end-user might simply load the kinematic system, defines a target task to be performed, and the system may automatically determine a motion of the kinematic system enabling to perform said task and for which the probability of cable failure is the lowest. The system may then automatically control the kinematic system according to the determined motion.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims.

What is claimed is:

1. A computer implemented method for simulating a motion of a cable of a real kinematic system having at least one joint, which comprises the following steps of:
   receiving a virtual representation of the real kinematic system;
   receiving a target task to be performed by the real kinematic system;
   receiving a starting pose of the real kinematic system;
   using the virtual representation of the real kinematic system for simulating, from the starting pose, a motion of the real kinematic system enabling the real kinematic system to perform the target task, wherein the real kinematic system is simulated without the cable, and wherein a simulation is configured for calculating a next joint value from a previous joint value;
   calculating, at an end of each simulation time interval, a next joint value from a previous joint value;
   using the next joint value as input to a cable position artificial intelligence (AI) algorithm trained for outputting a cable position for the next joint value;
   storing an outputted cable position for the next joint value; and
   displaying the virtual representation of the real kinematic system characterized by the next joint value and its associated said outputted cable position.

2. The method according to claim 1, wherein the cable position AI algorithm is a regression supervised learning algorithm.

3. The method according to claim 1, wherein the target task is configured for defining an action or process to be performed by the real kinematic system and that depends on a surrounding environment, or a position to be reached by at least one part of the real kinematic system with respect to the surrounding environment.

4. The method according to claim 1, which further comprises controlling the real kinematic system according to a simulated joint value and the outputted cable position.

5. The method according to claim 4, which further comprises:
   determining a set of end poses enabling the real kinematic system to perform the target task, and, for each of the end poses, performing the simulation of the motion of the real kinematic system, wherein the motion starts from the starting pose and ends with an end pose, wherein at an end of each said simulation time interval, the cable position AI algorithm is further configured for outputting a cable failure probability value;
automatically selecting the end pose corresponding to a lowest cable failure probability value; and
controlling the real kinematic system according to simulated joint values and outputted cable positions that result in the lowest cable failure probability value.

6. The method according to claim 5, which further comprises calculating the cable failure probability value from a rate of a force acting on the cable.

7. The method according to claim 1, wherein the cable extends from a first extremity to a second extremity and is modeled as a set of links or cable subparts, successively connected to one another from a first link modeling the first extremity to a last link modeling the second extremity, and wherein, at an end of each said simulation time interval, the outputted cable position calculated with respect to the next joint value contains a position of each of the links or the cable subparts of the set.

8. A computer-implemented method for creating a training dataset for training a cable position artificial intelligence (AI) algorithm configured for simulating a motion of a cable of a real kinematic system having at least one joint, which comprises the steps of:
receiving a virtual representation of the real kinematic system;
receiving a starting pose and a set of end poses for the real kinematic system, the end poses defining different positions that have to be reached by the real kinematic system;
simulating, for each end pose of the set of end poses, a motion of the real kinematic system from the starting pose to the end pose, wherein a simulation is configured for simulating the motion of the real kinematic system and of the cable, wherein, at an end of each simulation time interval, performing a calculation of a next joint value from a previous joint value and in a corresponding simulated cable position for the next joint value, a joint value data subset containing the next joint value is collected for populating an input training dataset, and a cable information data subset containing a corresponding simulated cable position is associated to the joint value data subset and collected for populating an output training dataset; and
storing the input training dataset and the output training dataset.

9. The computer-implemented method according to claim 8, wherein, at an end of each said simulation time interval, a rate of a force acting on the cable is calculated for the simulated cable position, and wherein the cable information data subset contains additionally said rate of said force in association with the simulated cable position.

10. A computer-implemented method configured for providing a trained cable position artificial intelligence (AI) algorithm configured for simulating a motion of a cable of a real kinematic system having at least one joint, which comprises the steps of:
receiving a training dataset with a first interface, the training dataset containing an input training dataset and an output training dataset, wherein:
the input training dataset contains several joint value data subsets, wherein each of the joint value data subsets contains a next joint value;
the output training dataset contains for each of the joint value data subsets, a cable information data subset having a corresponding simulated cable position;
training the cable position AI algorithm, wherein the joint value data subsets are used as input training data for the cable position AI algorithm and the cable information data subsets are used as output training data; and
providing a trained cable position AI algorithm with a second interface.

11. The computer-implemented method according to claim 10, wherein each said cable information data subset includes a rate of a force acting on the cable for a considered simulated cable position.

12. A data processing system, comprising:
a processor; and
an accessible memory connected to said processor, the data processing system configured to:
receive a virtual representation of a real kinematic system;
receive a target task to be performed by the real kinematic system;
receive a starting pose of the real kinematic system;
use the virtual representation of the real kinematic system for simulating, from the starting pose, a motion of the real kinematic system enabling the real kinematic system to perform the target task, wherein the real kinematic system is simulated without a cable, and wherein a simulation is configured for calculating a next joint value from a previous joint value;
calculate, at an end of each simulation time interval, the next joint value from the previous joint value;
use the next joint value as an input to a cable position artificial intelligence (AI) algorithm trained for outputting a cable position for the next joint value;
store an outputted cable position for the next joint value; and
display the virtual representation of the real kinematic system characterized by the next joint value and its associated said outputted cable position.

13. The data processing system according to claim 12, wherein the data processing system is further configured for controlling the real kinematic system according to simulated joint values and outputted cable positions.

14. The data processing system according to claim 13, wherein the data processing system is configured for determining a set of end poses enabling the real kinematic system to perform the target task, and, for each of said end poses, to perform a simulation of the motion of the real kinematic system, wherein the motion starts from the starting pose and ends with an end pose, wherein at an end of each said simulation time interval, the cable position artificial intelligence (AI) algorithm is further configured for outputting a cable failure probability value, the data processing system being further configured for automatically selecting the end pose corresponding to a lowest cable failure probability value, and for controlling the real kinematic system according to the simulated joint values and the outputted cable positions that result in the lowest cable failure probability value.

15. A non-transitory computer-readable medium encoded with executable instructions that, when executed, cause at least one data processing systems to:
receive a virtual representation of a real kinematic system;
receive a target task to be performed by the real kinematic system;
receive a starting pose of the real kinematic system;
use the virtual representation of the real kinematic system for simulating, from the starting pose, a motion of the real kinematic system enabling the real kinematic system to perform the target task, wherein the real kinematic system is simulated without a cable, and wherein a simulation is configured for calculating a next joint value from a previous joint value;

use, at an end of each simulation time interval resulting in a calculation of the next joint value from the previous joint value, the next joint value as input to a cable position artificial intelligence algorithm trained for outputting a cable position for the next joint value; and storing an outputted cable position for the next joint value, and to display the virtual representation of the real kinematic system characterized by the next joint value and its associated said outputted cable position.

* * * * *